(12) United States Patent
Gao et al.

(10) Patent No.: US 7,774,193 B2
(45) Date of Patent: Aug. 10, 2010

(54) PROOFING OF WORD COLLOCATION ERRORS BASED ON A COMPARISON WITH COLLOCATIONS IN A CORPUS

(75) Inventors: Jianfeng Gao, Redmond, WA (US); William B. Dolan, Kirkland, WA (US); Hsiao-Wuen Hon, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 11/633,788

(22) Filed: Dec. 5, 2006

(65) Prior Publication Data

US 2008/0133444 A1    Jun. 5, 2008

(51) Int. Cl.
*G06F 17/28* (2006.01)
*G06F 17/21* (2006.01)

(52) U.S. Cl. ............... 704/4; 704/2; 704/9; 704/10; 707/3; 707/4; 707/5

(58) Field of Classification Search ............... 704/1–10
See application file for complete search history.

(56) References Cited

U.S. PATENT DOCUMENTS

| | | | | |
|---|---|---|---|---|
| 4,456,973 | A | 6/1984 | Carlgren | 704/1 |
| 4,674,065 | A * | 6/1987 | Lange et al. | 382/311 |
| 5,060,154 | A | 10/1991 | Duncan, IV. | 715/533 |
| 5,799,276 | A | 8/1998 | Komissarchik | 704/251 |
| 5,909,667 | A | 6/1999 | Leontiades | 704/275 |
| 6,064,961 | A | 5/2000 | Hanson | 704/260 |
| 6,081,772 | A | 6/2000 | Lewis | 704/1 |
| 6,173,252 | B1 * | 1/2001 | Qiu et al. | 704/9 |
| 6,676,412 | B1 | 1/2004 | Masterson | 434/169 |
| 6,760,700 | B2 | 7/2004 | Lewis | 704/235 |
| 7,249,012 | B2 | 7/2007 | Moore | 704/4 |
| 7,574,348 | B2 * | 8/2009 | Hon et al. | 704/9 |
| 2004/0006466 | A1 * | 1/2004 | Zhou et al. | 704/251 |
| 2004/0030540 | A1 * | 2/2004 | Ovil et al. | 704/1 |
| 2005/0125215 | A1 * | 6/2005 | Wu et al. | 704/1 |

(Continued)

FOREIGN PATENT DOCUMENTS

KR    10-1999-0071163 A    9/1999

(Continued)

OTHER PUBLICATIONS

Robb, "Google as a Quick and Dirty Corpus Tool", TESL-EJ, vol. 7, No. 2, Sep. 2003.*

(Continued)

*Primary Examiner*—Richemond Dorvil
*Assistant Examiner*—Jialong He
(74) *Attorney, Agent, or Firm*—Joseph R. Kelly; Westman, Champlin & Kelly, P.A.

(57) ABSTRACT

Collocation errors can be automatically proofed using local and network-based corpora, including the Web. For example, according to one illustrative method, one or more collocations from a text sample are compared with a corpus such as the content of the Web. The collocations are identified for whether they are disfavored in the corpus. Indications are provided via an output device of whether the collocations are disfavored in the corpus. Additional steps may then be taken such as searching for and providing potentially proper word collocations via a user output.

17 Claims, 6 Drawing Sheets

U.S. PATENT DOCUMENTS

2006/0206806 A1* 9/2006 Han et al. .................. 715/513
2006/0282255 A1* 12/2006 Lu et al. ...................... 704/2

FOREIGN PATENT DOCUMENTS

| KR | 10-2001-0097365 A | 11/2001 |
| KR | 10-2001-0104129 A | 11/2001 |
| KR | 10-2004-0044176 A | 5/2004 |

OTHER PUBLICATIONS

Shei et al., "An ESL writer's collocatioinal aid", Computer Assisted Language Learning, vol. 13, No. 2, 2000.*

Bolshakov, "Web-Assisted detection and correction of joint and disjoint malapropos word combination", 10th International Conference on Applications of Natural Language Processing to Information Systems, Jun. 2005.*

Chang et al. "Computer assisted langauge learning based on corpora and natural language processing: the experience of project CANDLE", IWLeL, Dec. 2004.*

"Web-Based Language Testing" by Carsten Roever, *Language Learning & Technology*, May 2001, vol. 5, No. 2, pp. 84-94.

"Classroom Success of an Intelligent Tutoring System for Lexical Practice and Reading Comprehension" by Michael Heilman, Kevyn Collins-Thompson, Jamie Callan and Maxine Eskenazi. To appear in Proceedings of the Human Language Technology Conference. Rochester, NY, Apr. 22-27, 2007.

"Validation of a web-based ESL test" by Carol A. Chapelle, Joan, Jamieson and Volker Hegelheimer. Language Testing, vol. 20, No. 4, Oct. 2003, pp. 409-439.

European Patent Application 07 85 4974 Extended Search Report dated Feb. 12, 2010.

Inkpen D D and Hirst G: "Aquiring Collections for Lexical Choice Between Near-Synonyms" Unsupervised Lexical Acquisition: Proceedings of the Workshop of the ACL Special Interest Group in theLexicon (SIGLEX) Jul. 2002, pp. 67-76.

Seretan V and Nerima L and Wehrli E: "Using the Web as a Corpus for the Syntactic-Based Collocation Identification" Proceedings of the 4th International Conference on Language Resources and Evaluation (LREC 2004) pp. 1871-1874.

Jian J-Y and Chang Y-C and Chang J S: "Tango: Bilingual Collocational Concordance" The Companion Volume to the Proceedings of 42st Annual Meeting of the Association for Computational Linguistics Jul. 2004, pp. 166-169.

Renouf A and Kehoe A and Mezquiriz D: "The Accidental Corpus: Some Issues in Extracting Linguistic Information From the Web" Language and Computers: Advances in Corpus Linguistics. Papers from the 23rd International Conference on English Language Research on Computerized Corpora (ICAME 23) May 22, 2002, pp. 403-419.

European Patent Application No. 07 854 974.8 Examination Report dated May 10, 2010.

* cited by examiner

FIG. 4

PROOFING OF WORD COLLOCATION ERRORS BASED ON A COMPARISON WITH COLLOCATIONS IN A CORPUS

BACKGROUND

Translations between two different languages often involve difficulties in cases where the meaning of individual words is further constrained by the context of usage. When people learn a second language that is not their native language, there are typically many choices of words that seem like they would translate correctly, but are actually not used in certain groupings, or collocations, in typical usage among native speakers. Such collocations might be syntactically or grammatically correct in an abstract sense, but are outside of normal usage, and would often instinctively seem peculiar or awkward to native speakers. Combinations of words in a language often conform to set patterns that form single lexical items, so that even groups of words that have similar meanings and are ordered in a similar grammatical relationship may not fall into any lexical item within the native usage of the language, whether or not the lexical item is explicitly preconceived by native speakers as constraining the language from alternative usages.

For example, someone learning English as a second language might find "strong" and "powerful" as two alternate translations of a single word in her native language, and "to make" and "to do" as two alternate translations of a different word. Without very much experience in English usage, the learner might write "I had a cup of powerful tea" rather than "I had a cup of strong tea", or "I did a plan" instead of "I made a plan". Similar errors of collocation may be typical of a native speaker of any language, who is learning any other language in which she is not a native speaker. Such erroneous collocations of words are typically avoided only after a long period of contextual experience and interactive practice with the language, and typically cannot be resolved using a dictionary or any other type of fast and easily accessible language reference.

The discussion above is merely provided for general background information and is not intended to be used as an aid in determining the scope of the claimed subject matter.

SUMMARY

Collocation errors can be automatically proofed using local and network-based corpora, such as the Web, in a variety of embodiments that include methods, computing systems, and software that encodes executable instructions for computing systems. For example, according to one illustrative method, one or more collocations from a text sample are compared with a corpus such as the content of the Web. The collocations are identified for whether they are disfavored in the corpus. Indications are provided via an output device of whether the collocations are disfavored in the corpus. Additional steps may then be taken such as searching for and providing potentially proper word collocations via a user output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 depicts a user interface for a computing system enabling a method according to an illustrative embodiment.

DETAILED DESCRIPTION

Figure 1:
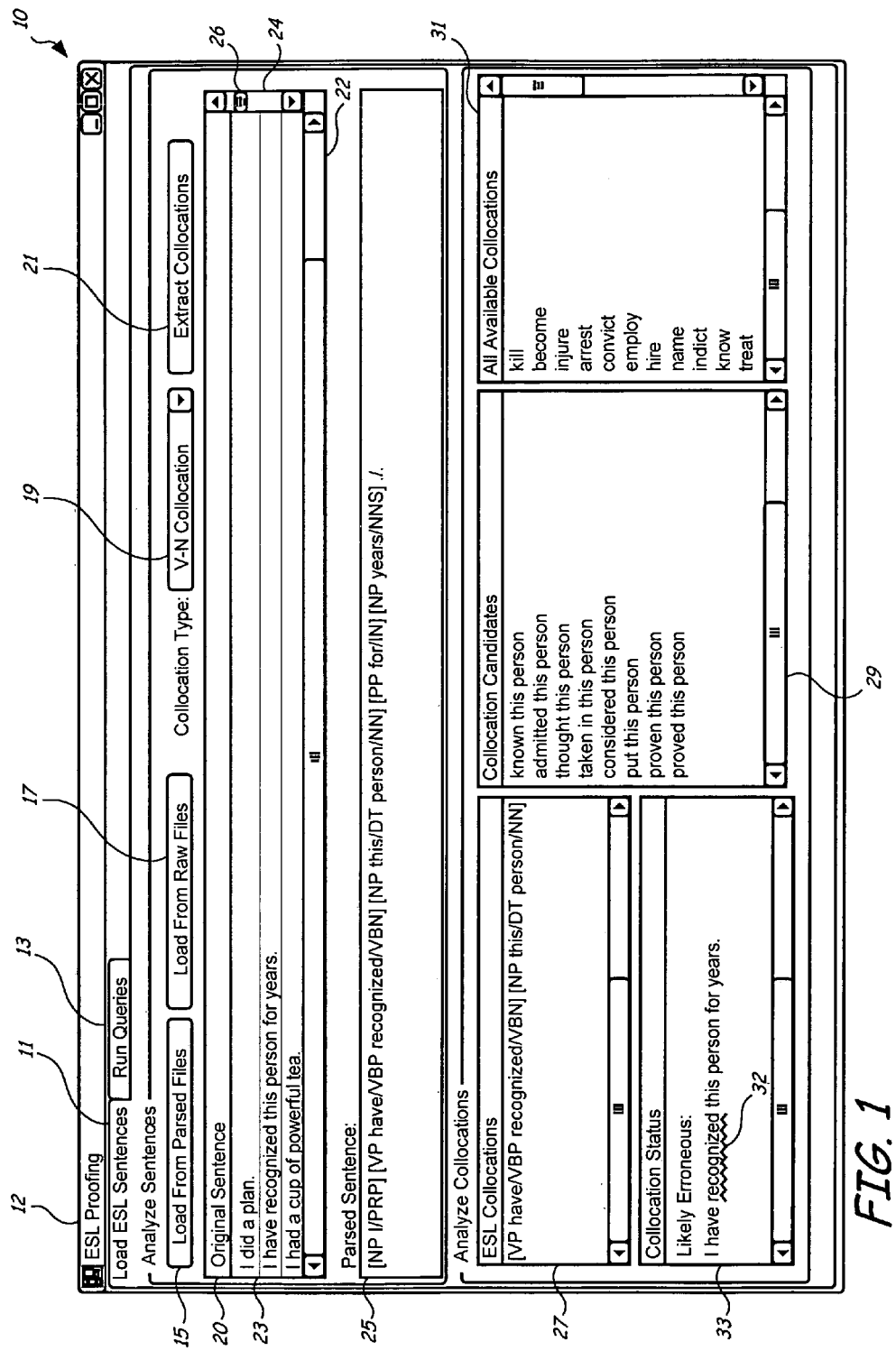
FIG. 1 depicts a user interface for a computing system enabling a method according to an illustrative embodiment.

FIG. 1 depicts a collocation error proofing interface 10 for a computing system that enables a method for collocation error proofing, according to an illustrative embodiment. Collocation error proofing interface 10 may be illustrative of embodiments that include computing systems, and executable instructions configured to be executable by computing systems, and contexts that enable method embodiments, for example. The following discussion provides further details of various illustrative embodiments. While certain illustrative arrangements and labels, and samples of text being compared by a computer-implemented method, are included in this and the subsequent figures, they are intended as illustrative and indicative of the variety and broader meaning provided in the discussion and claims herein.

Collocation error proofing interface 10 constitutes a graphic display panel associated with a software application, one of many graphic display panels that may be open at one time in a graphical user interface on an output device such as a computer monitor, in the illustrative embodiment of FIG. 1. Collocation error proofing interface 10 is labeled "ESL Proofing" in the title bar 12, in reference to one illustrative embodiment directed to proofing text samples entered by learners of English as a second language (ESL). ESL provides an ideal application for one illustrative embodiment of collocation error proofing, because erroneous collocations have been found to make up a large portion of errors by intermediate students of English as a second language.

The illustrative embodiment of an ESL proofing application is referred to repeatedly in the discussion below, though with the understanding that it is by way of an illustrative example only, indicative of broader principles that may be applied to a wide range of other embodiments. For example, other embodiments are described below that may operate without the collocation error proofing interface 10 shown in FIG. 1, while still other embodiments may be directed to learners of any other language as a second language, and other embodiments may be directed more toward children learning to master their own native language, for example.

Figure 4:
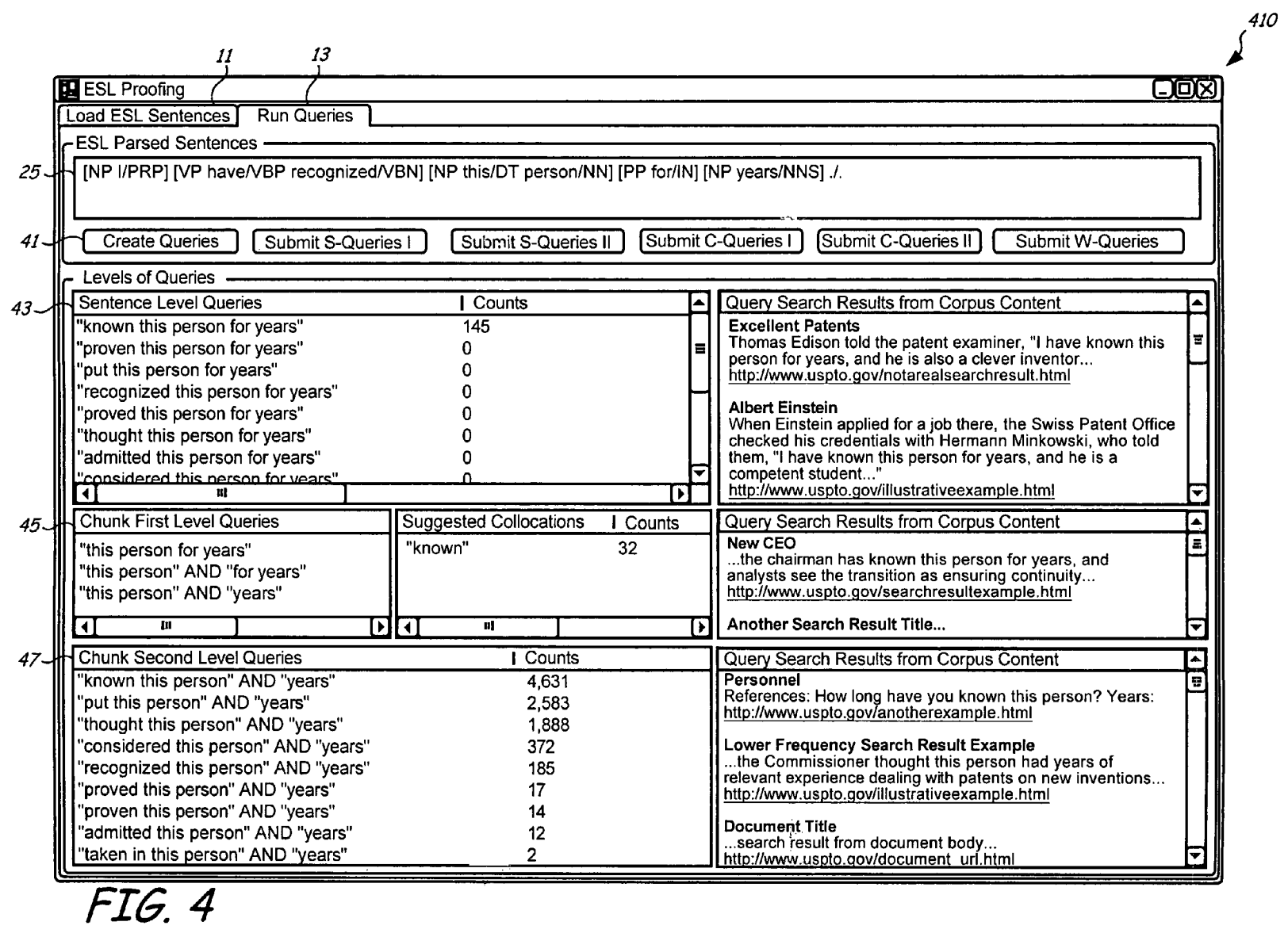

Collocation error proofing interface 10 includes two tabs at the top thereof, corresponding with two different task modes: tab 11, labeled "Load ESL Sentences" (again, directed to a particular ESL-directed embodiment), and tab 13, labeled "Run Queries". FIG. 1 depicts user interface 10 with the "Load ESL Sentences" tab 11 selected, with its associated buttons, captions, text boxes, and other user interface elements (or "widgets") on display. FIG. 4 depicts collocation error proofing interface 10 with the "Run Queries" tab 13 selected and user interface elements associated with that task on display, the discussion of which appears further below.

The user interface panel under the "Load ESL Sentences" tab 11 includes a variety of interactive input and output user interface elements, which are described in turn as follows. They are generally divided between an upper section with the title caption of "Analyze Sentences", and a lower section with the title caption of "Analyze Collocations".

Along the top of the "Analyze Sentences" section appears a row of interface elements: a "Load From Parsed Files" button 15, a "Load From Raw Files" button 17, a caption reading "Collocation Type" in front of a combo box 19 that presently reads "V-N Collocation" (discussed below) in the depiction, and an "Extract Collocations" button 21. Below those widgets is a text box 23 with left-right and up-down scrollbars 22, 24 and a title bar 20 reading "Original Sentence". Below that is a text box 25 with the caption, "Parsed Sentence". In general, these interface elements enable user functionality for loading sentences from a text sample and preparing them for comparison with collocations in content available on a network for error proofing.

Text box 23 includes a number of sample sentences from a text sample, such as a document written by an ESL learner. As indicated by the compressed size of the scroll thumb 26 in the trough of the up-down scrollbar 24 on text box 23, the sentences currently being displayed are a small fraction of the total list of sentences currently loaded in the text box, which a user may access by moving the scroll thumb 26. The sentences displayed in text box 23 represent typical mistakes an intermediate student of English as a second language might make: "I did a plan", "I have recognized this person for years", and "I had a cup of powerful tea".

These sentences might be loaded manually from a document open in another application, or they might have been automatically selected as having ESL-type errors and imported from another document or multiple documents, after a user initiates the process by selecting either the "Load From Parsed Files" button 15 or the "Load From Raw Files" button 17. In another embodiment, a different application such as a word processing application may have an ESL proofing trigger, which may be active as a default, which may automatically bring up a panel recommending usage of the collocation error proofing interface 10 when ESL-type errors are detected in the text being input in the word processing program.

As suggested by buttons 15 and 17, text samples may or may not already be parsed when taken up by the application. If a text sample is not yet parsed, it may be parsed after loading before additional steps are taken, for example. A parsed sentence is depicted in text box 25. In particular, this is a parsed version of the second sentence depicted in text box 23, which has local highlighting around it to indicate it being selected by a user, such as by being left-clicked with a mouse or tapped with a light pen, for example, or by some other user input mechanism.

Parsing has been an active area of development in natural language processing and natural language understanding. Parsing may include tasks such as part-of-speech tagging, chunking, and semantic labeling, for example. In the embodiment depicted in FIG. 1, the sentence in text box 25 has been part-of-speech tagged and chunked. Other embodiments may include other combinations of parsing tasks, including some that are typically directed more toward some non-Western languages, such as word segmentation.

In the parsed sentence in text box 25, each word in the original sentence is immediately followed by a solidus (i.e. a "forward slash") separating the word from a two or three letter part-of-speech tag assigned to that word. Some illustrative options for part-of-speech tags are listed below. The period at the end of the sentence is also accompanied by its own solidus separating it from another period, serving as a tag equivalent to a part-of-speech tag to indicate the function of the punctuation. The words of the sentence, in groups of one or two (or more in other examples), are also surrounded by brackets to correspond to chunk boundaries, with a two-letter chunk type label at the beginning of the interior of each bracketed set. The part-of-speech tags represented in this sentence include "PRP" for a personal pronoun; "VBP" for a present tense verb other than third person singular; "VBN" for a past participle verb; "DT" for a determiner; "NN" for a singular or fungible common noun; "IN" for a preposition or subordinating injunction; and "NNS" for a plural common noun. An illustrative list of part-of-speech tags according to one exemplary embodiment is provided as follows, while other schemes of part-of-speech tags, with different definitions and more or less specificity, may be used in other embodiments. Some tags are illustrated with examples, in English, for the present exemplary embodiment.

TABLE 1

Illustrative list of part-of-speech tags:

| | |
|---|---|
| 1. | CC - Coordinating conjunction (e.g. "and", "but", "nor", "or", "yet", "plus", "minus", "times", "over" (as in divide by)) |
| 2. | CD - Cardinal number |
| 3. | DT - Determiner (includes articles and indefinite determiners, e.g. "a", "an", "every", "no" (as article), "the"; and e.g. "another", "any", "some", "each", "either", "neither", "that", "these", "this", "those", some uses of "all", "they") |
| 4. | EX - Existential "there" |
| 5. | FW - Foreign word |
| 6. | IN - Preposition or subordinating injunction |
| 7. | JJ - Adjective |
| 8. | JJR - Adjective, comparative |
| 9. | JJS - Adjective, superlative |
| 10. | LS - List item marker |
| 11. | MD - Modal verb (e.g. "can", "could", "may", "might", "must", "shall", "should", "will", "would") |
| 12. | NN - Noun, common, singular or fungible |
| 13. | NNS - Noun, common, plural |
| 14. | NNP - Proper noun, singular |
| 15. | NNPS - Proper noun, plural |
| 16. | PDT - Predeterminer |
| 17. | POS - Possessive ending |
| 18. | PRP - Pronoun, personal |
| 19. | PRP$ - Possessive pronoun (e.g. "'s", "s'", "'") |
| 20. | RB - Adverb |
| 21. | RBR - Adverb, comparative |
| 22. | RBS - Adverb, superlative |
| 23. | RP - Particle |
| 24. | SYM - Symbol |
| 25. | TO - "To" |
| 26. | UH - Exclamation |
| 27. | VB - Verb, base form |
| 28. | VBD - Verb, past tense |
| 29. | VBG - Verb, gerund or present participle |
| 30. | VBN - Verb, past participle |
| 31. | VBP - Verb, present tense, other than third person singular |
| 32. | VBZ - Verb, present tense, third person singular |
| 33. | WDT - Wh-determiner |
| 34. | WP - Wh-pronoun |
| 35. | WP$ - Possessive wh-pronoun ("whose") |
| 36. | WRB - Wh-adverb |

The parsed text sample as represented by the parsed sentence in text box 25 has also been chunked, in this depiction, where pairs of brackets surround each defined chunk, and a chunk type is indicated with a label at the beginning of the content of each bracketed set. Chunking is a relatively tractable parsing task that can be performed based on superficial and local information. Chunking involves dividing sentences into non-overlapping segments so that each chunk contains one major head word, along with words that associate with it. Chunking therefore can be thought of as dividing a sentence into phrases, but specifically into the smallest phrasal units that can be defined, to prevent overlap of phrases, in this illustrative embodiment. Chunking enables the syntactic structure of a text and the relationships or dependencies between the phrases to become identifiable. For example, one noun phrase may be the subject of the verb phrase, and a second noun phrase may be the object of the verb phrase.

The illustrative chunks in FIG. 1 provide good examples of this. The first chunk is labeled NP, for a noun phrase, and is based on the lone major head word, "I", the subject of the sentence. The second chunk is labeled VP, for a verb phrase, and includes "have" and "recognized"; the two individual verbs work together to form the integrated concept of a past participle form of the verb "to recognize". The third chunk is another NP or noun phrase, including a head word "person" along with an associated, supporting word, to form the single concept of "this person" as the object of the sentence. A fourth chunk labeled PP, for a prepositional phrase, and a fifth chunk labeled NP, for another noun phrase, each containing a single word. The period, though tagged as a period, is omitted from the chunks.

The parsing system associated with or used by collocation error proofing interface 10 can be trained to automatically perform the part-of-speech tagging and chunking accurately and reliably, in ways such as those familiar to persons skilled in the art of natural language processing.

The lower section of the user interface panel under the "Load ESL Sentences" tab 11, with the title caption of "Analyze Collocations", includes a set of text boxes 27, 29, 31, and 33, each depicted with a title bar and at least one scroll bar. The title bar of text box 27 reads "ESL Collocations", and the text box is shown to include two collocated chunks from the sentence in text box 25, a verb phrase for "have recognized", and a noun phrase for "this person", the object of the sentence. As they appear, with part-of-speech tags, and chunking labels and brackets, the collocated phrases read "[VP have/VBP recognized/VBN] [NP this/DT person/NN]". This collocation was provided in text box 27 due to collocation type combo box 19 being set to "V-N Collocation", an option indicating collocations with a verb phrase and subsequent noun phrase located next to each other. The collocation corresponding to that setting has been extracted from the sentence in text box 25.

Text box 29 contains collocation candidates, as indicated in its title bar. The collocation candidates have the same noun phrase, "this person", as the collocation in text box 27, but a variety of different past participle verbs preceding the noun phrase. These candidate verbs are candidates to replace "recognized" as the verb head word, in past participle form and subsequent to "have" in a verb phrase. They include "known", "admitted", "thought", and so forth. They also do not include the original collocation, as a comparison of the original collocation with the content of a corpus revealed that it was either scarce or absent in the content of the corpus, and therefore disfavored and likely erroneous.

Collocation error proofing interface 10, or an application associated with or used with it, may therefore indicate that the original collocation is disfavored in the content of the corpus and therefore likely erroneous. This indication may be provided for a user to see in text box 33, for example, as in the illustrative embodiment of FIG. 1. Text box 33 indicates collocation status, as its title bar suggests. It indicates this collocation to be disfavored in the content of the corpus, or likely erroneous, and posts a squiggly line 32 under the verb head word in the collocation found to be disfavored, which is a candidate for replacement. A user might select one of the collocation candidates in text box 29, such as by double-clicking on the desired replacement collocation, for example, to replace the collocation indicated to be disfavored. This indication may also be provided, for example, in a separate word processing program, network navigation program, or other application, such as by adding a marking to the improper collocation. Such a marking might be by highlighting or underlining the disfavored or erroneous collocation, such as with a brightly colored, squiggly line, to attract the user's attention.

The collocation candidates in text box 29 are provided as a result of comparing the collocation in text box 27 with content available in a large corpus. This may include a local corpus, and/or a network-based corpus that includes content hosted on distributed resources and accessible over a network, such as the World Wide Web, in this illustrative embodiment. In other embodiments, the corpus may comprise the content of other available networks such as an intranet, a wide area network, a local area network, or some other type of network, for example. Content derived from a Web search, using the Web as the corpus, may be used together with a search of a conventional corpus, such as the Wall Street Journal corpus, for example. The occurrence of a collocation in the conventional corpus may be given particular weight relative to occurrences of the collocation in the Web content, since the corpus should be relatively assured of consistently proper usage, compared with Web content, which may include both a wider variety of sources and the inclusion of more casual writing, relative to a corpus. However, the Web content also provides substantial advantages in its sheer volume relative to any available conventional corpus of language usage. The proper collocation corresponding to any given collocation in a text sample may be unlikely to occur in a conventional corpus. On the other hand, it has been found that, at least in English, just about any word collocation that might occur in proper usage can be found on the Web, or at least a structurally equivalent collocation that may be revealed by a flexible search of different query terms based on the collocation, as discussed further below. It has also been found that a proper replacement collocation can be found on the Web for at least most erroneous collocations found in typical text samples from, for example, learners of English as a second language. Failure of a particular sentence or collocation to show up in a Web search gives a higher confidence that the sentence or collocation is erroneous. Search results may be evaluated to see if similar alternatives occur with far greater frequency than a subject collocation, so that a possible occurrence of a collocation on the Web despite being erroneous will be revealed as such.

At the time of this writing, most text content available on the Web is in English. Many current human languages have little content available on the Web, and even some commonly spoken languages have relatively modest representation among Web content. Hindi, for example, is currently the third most widely spoken language in the world, but was found in at least one study to be represented by less Web content than Icelandic, which has less than one one-thousandth as many speakers. The efficacy of collocation error proofing depends in part on the sample size of the corpus available as a basis of comparison for the collocations in a text sample to be proofed. Therefore, specialized methods may be used for Web-based collocation error proofing in different languages, that may not be needed for proofing a text sample in English.

These may include, for example, particularly targeting or screening for content in a target language that matches the language of the text sample, or using a specialized network, corpus, or digitized library, in addition to the Web or other content accessed over a network, for the corpus used as a basis for comparison. These methods may also include using a search utility enabled to index and search content not encoded in Unicode, for example, or using specialized character encoding schemes or transformation formats to be able to read, index, and search content in non-standard coding formats. There are indications that a large amount of content in languages using writing systems other than the Roman alphabet, even a large majority of the content on the Web for some languages, exists in non-standard coding formats, so that a search enabled to index and search those non-standard coding formats may yield much more content than otherwise. Methods such as these, according to various embodiments, may contribute to the capability of a Web-based collocation proofing system as applied to the widest possible range of languages.

Additional strategies for constraining or biasing the Web content being searched may also include applying preferences to categories or classifications of URLs. Some URLs may be specifically catalogued for preferential search, and/or for applying higher weight to collocations found in their content, if their content is known to include large libraries or corpora of reliably proper language usage. This could also include preferential biasing of a search or weighting of search results based on top-level domains (TLDs); for example, added search order or result weighting could be applied to URLs with a TLD of "edu" or "gov" as opposed to "com" or "org". For searches involved in collocation proofing for languages other than English, screening searches for Web content in the target language could also include biasing or restricting a search or the weight applied to its results on the basis of country-code TLDs assigned to countries where the target language is an official language or has substantial usage. For example, a collocation proofing application directed to proofing a text sample in French could be biased or restricted to searches of Web content found on websites with a TLD of "fr", "be", "ch", or "ca" (the country code TLDs for France, Belgium, Switzerland, and Canada, respectively), or other country code TLDs belonging to other officially or substantially Francophone nations.

Text box 31 shows part of a longer list of all available verbs that are found in the content of the corpus that form the head word of a verb phrase that precedes "this person" in a collocation. As indicated by the scroll thumb in the up-and-down scroll bar on the right side of the text box 31 being a fraction of the size of the scroll bar, the list is much longer than the fraction of available verbs currently visible in text box 31 in the depiction of FIG. 1. Most of the available collocations listed in text box 31 were not selected as collocation candidates like the listings in text box 29, because they did not score as high in a fuzzy match scoring scheme, based on a set of criteria for likely propriety of matching the original collocation and replacing it with a collocation that provides the original meaning in a corrected form.

Illustrative methods of comparing the collocation in text box 27, of identifying whether it is disfavored in the content of the corpus, and of providing suggested replacements for it, are described in further detail with reference to the remaining figures.

Figure 2:
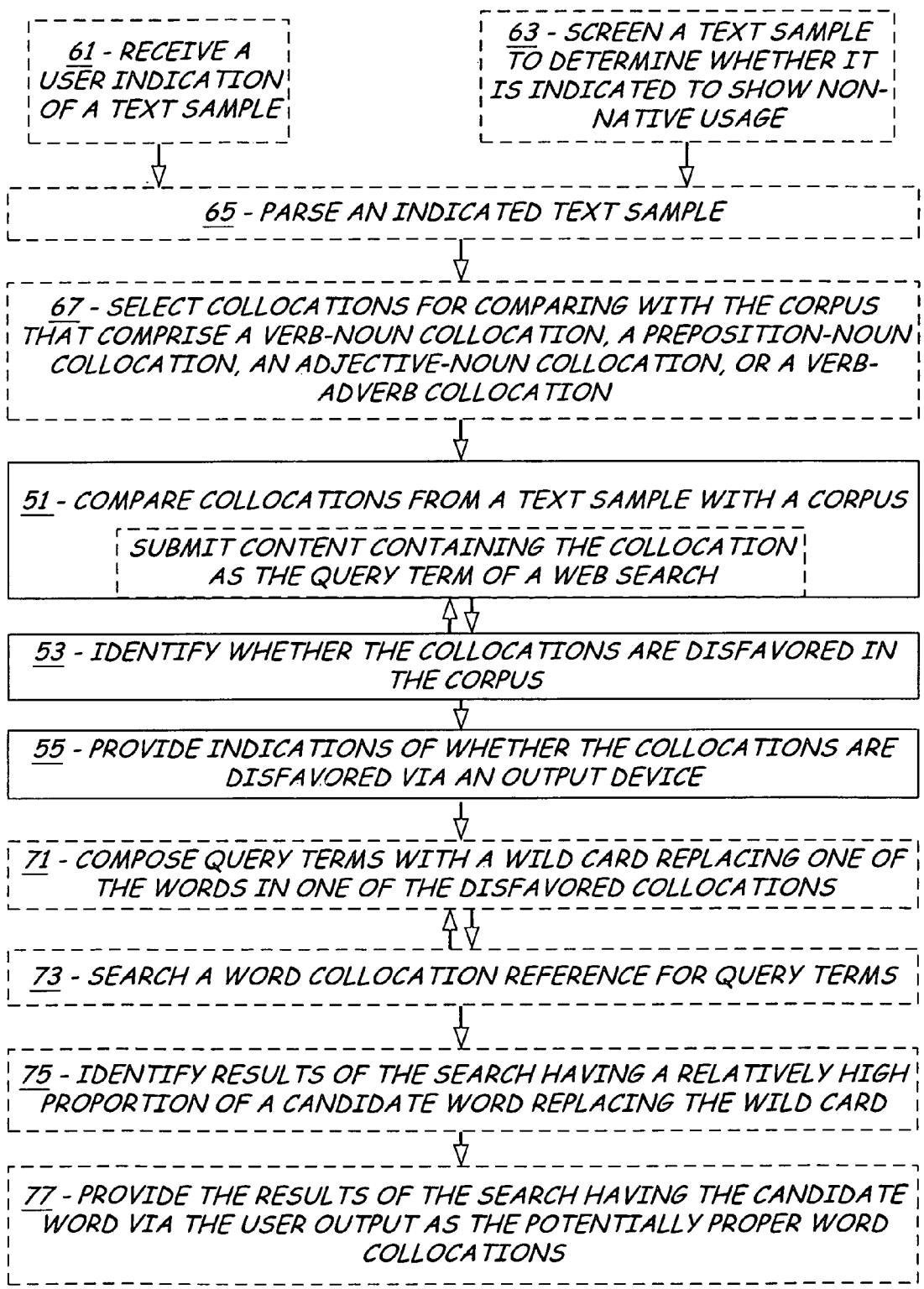
FIG. 2 depicts a flowchart of a method according to an illustrative embodiment.

FIG. 2 depicts a flowchart of a collocation proofing method 50, according to an illustrative embodiment, certain aspects of which are analogous to aspects of the collocation error proofing interface 10 depicted in FIG. 1. The central steps of method 50 are depicted in solid outlining in the flowchart of FIG. 2. These include step 51, of comparing one or more collocations from a text sample with a corpus, such as by submitting content containing the collocation as the query term of a Web search; step 53, of identifying whether the collocations are disfavored in the corpus; and step 55, of providing indications of whether the collocations are disfavored via an output device. As is depicted with a recursive flowchart arrow, steps 51 and 53 may be performed in repeated succession, to perform different kinds of comparisons of the collocations from the text sample with the corpus, and identifying whether the collocations are disfavored in the corpus as indicated by the different kinds of comparisons.

Steps 51, 53, and 55 may also involve or be preceded or followed by additional steps, such as those depicted here in dashed outlining. These include, for example, receiving an indication of or identifying word collocations in a text, such as by receiving a user input or selection or other form of indication of a text sample, as in step 61. It may also involve a default feature, in a word processing application or some other software application that involves human input of text, in which the input is monitored and screened for erroneous collocations or other indications of non-native usage, and additional steps are triggered if such indications are found, as in step 63. The text sample may also be parsed, as in step 65 and as illustratively discussed in relation to FIG. 1, although other embodiments of the method may be applied to text samples that are already parsed, for example.

Particular types of collocations may be particularly targeted for comparing with the corpus, as in step 67. This step includes selecting collocations such as verb-noun collocations, preposition-noun collocations, adjective-noun collocations, or verb-adverb collocations, for comparing with the corpus and performing additional collocation error proofing steps on. Any one of these individual categories of collocation might be used exclusively in some embodiments, while any or all of these collocation types, and/or additional collocation types, may be used in other embodiments. It has been found that using the four collocation types listed in step 67 covers a substantial portion of all collocation errors made by typical non-native language users. Selecting these particular collocation types involves first identifying the parts of speech in the text sample, such as by preparatory parsing steps, as in step 65 or as discussed in relation to FIG. 1.

Step 53, of identifying whether the collocations are disfavored in the corpus, may be performed repeatedly for a variety of individual query terms that are based on the collocation in different formats, and may take the form of a final determination, based on all query terms used, of whether collocations being compared to the corpus are or are not disfavored in the content of that corpus.

Figure 3:
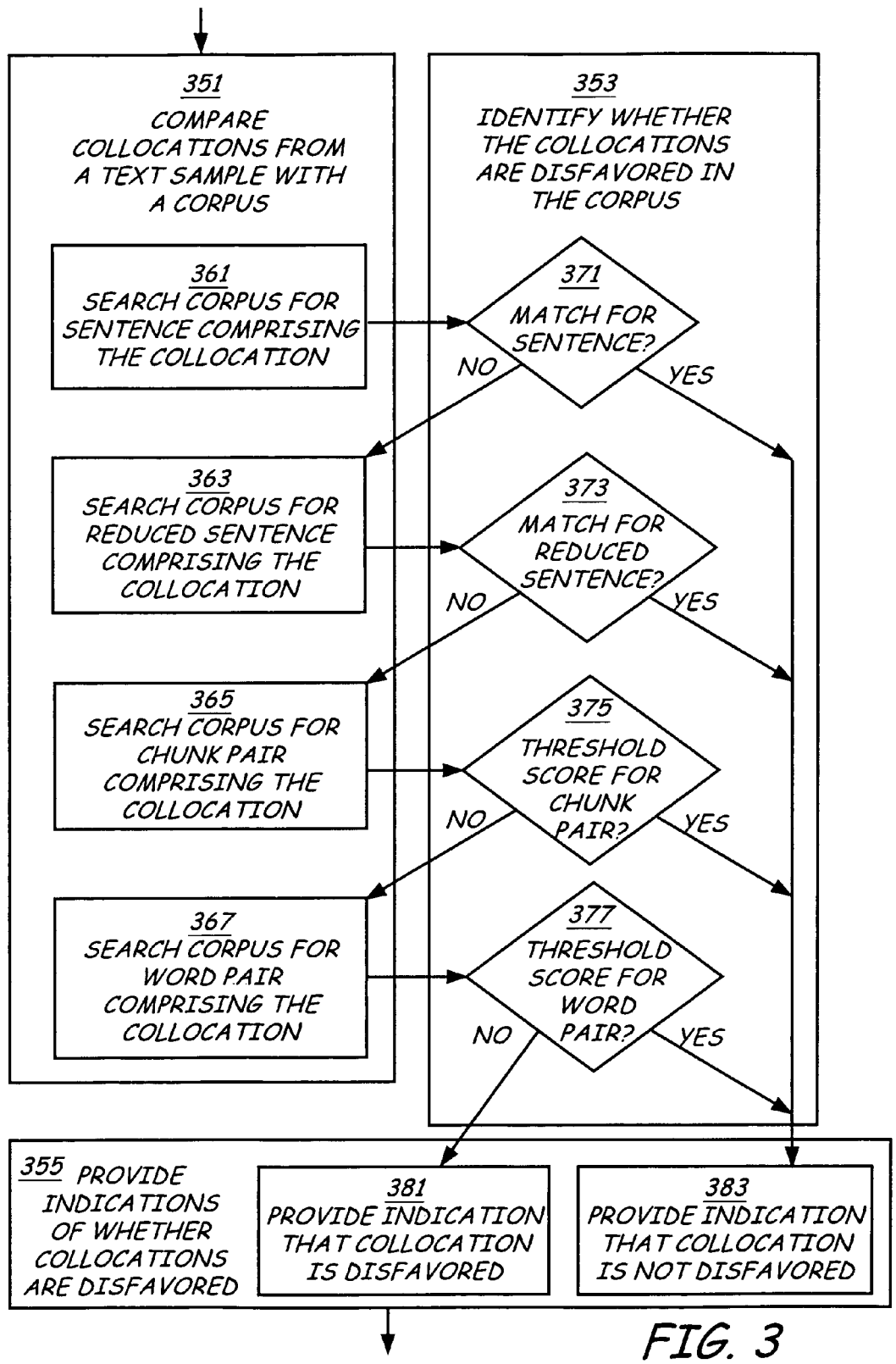
FIG. 3 depicts a flowchart of a method according to an illustrative embodiment.

One illustrative embodiment is further depicted in the analogous steps 351 and 353 in the flowchart of FIG. 3. In this embodiment, comparing collocations from a text sample with a corpus, as in step 51 of FIG. 2, may include a fuzzy match strategy, that includes searching the corpus for query terms that include either a complete sentence, a reduced sentence, a pair of chunks, or a pair of words, that include the collocation, as indicated in steps 361, 363, 365, and 367, respectively, in FIG. 3. A reduced sentence is formed by removing auxiliaries from a sentence that includes the collocation, where the auxiliaries are selected words from the sentence that may be pre-defined as not required to preserve the collocation in the sentence, in an illustrative embodiment. For example, a reduced sentence query template based on the erroneous collocation sentence "I have recognized this person for years" may be "have recognized this person". The chunk pair and word pair query terms may be for the particular words or chunks containing the collocation to be either immediately adjacent to each other, or within a pre-selected range of close proximity within the same sentence, such as with no more than one or two other words separating them, for example. The reduced sentence searches, chunk pair searches, and word pair searches in a fuzzy match search may also detect results with a different but equivalent word order, or use placeholders for certain function words and other types of words, so that, for example, "recognize this person" and "recognize that person" may be regarded as equivalent for a fuzzy match.

A collocation may be evaluated to be disfavored if query terms that comprise the collocation do not score above a pre-selected threshold matching score indicating a significant presence of fuzzy matches of the query terms in the corpus. Identifying whether the collocations are disfavored in the corpus, as in step 53 of FIG. 2, may include performing different types of searches for the query terms, including searching for a match of a sentence or a reduced sentence, as in steps 371 and 373, respectively, or evaluating a threshold score for matches found for chunk pairs or word pairs, as in steps 375 and 377, respectively, in FIG. 3. Since sentences and reduced sentences are much more specific, a single match or a small number of matches to one of those may be considered sufficient to indicate a collocation as not being disfavored or erroneous. Matches for pairs of chunks or pairs of words, since these are less constrained and more generic, may have a higher expectation of being found in at least a few search results even if erroneous, due to a relatively scarce residue of Web content written by inexpert users of the language. A higher threshold may therefore be set for chunk pair and word pair matches, one sufficient to indicate relative prevalence of the indicated pair of chunks or words, indicative of the word collocation corresponding to normal usage, as opposed to just a relatively trivial amount of representation in the corpus that might be expected for a disfavored word collocation, according to this embodiment.

The matching score may include a basic counter that assigns a certain cumulative score to each occurrence of a match of a chunk pair or word pair, for example, and only indicate a collocation to be proper rather than disfavored if enough matches are found to achieve a minimum total score. Scores for results with different queries may also be combined, giving more weight to more specific query terms, such as giving ten times as much weight per count of chunk pair matches as per count of word pair matches, as one illustrative example. Reduced sentences or full sentences may also be included in a match scoring evaluation rather than sufficing on their own to determine collocation status. For example, each match found for a reduced sentence containing the collocation pair from the text sample may be assigned a score that is twenty times the weight of a match per chunk pair and 200 times the weight per matching word pair, for example. Whatever method is used to evaluate matches or matching scores, the process may culminate in step 355, of providing indications either that the collocations are disfavored, as in step 381, or that they are not disfavored, as in step 383.

The weighting of the different query templates, and the threshold matching score used to distinguish common usage collocations from disfavored collocations, may be calibrated or tuned to greater or lesser sensitivity, either by a developer of the collocation proofing software, or by the end user as a user option. A user may want to scale the threshold lower to have a quicker process, albeit with a greater possibility of a few questionable or borderline disfavored collocations slipping through; or a user may opt for more thoroughness and set the threshold higher, and possibly spend more time looking through flagged collocations that nevertheless turn out to be in relatively comparable usage to any potential replacements, but with a greater assurance of eliminating any erroneous collocations from the text sample.

Because the order of the query terms in FIG. 3 goes from more specific to more generic and less constrained, gathering the search results from each successive step is likely to take longer than for the previous step. While all of the steps of returning search results are likely to require only a fraction of a second, performance of the system may still be made more efficient and the total time reduced by ending the processes of steps 351 and 353 as soon as a sufficient indication of a match is found, without going through the remaining, increasingly time-consuming steps. If many matches are found for a given sentence or reduced sentence, for example, spending the relatively larger fraction of a second required to perform chunk pair or word pair searches may be avoided. Searches for the same collocation using different query terms may therefore be pursued in succession until either one of the query terms provides search results that meet a pre-selected threshold for matching the collocation, or all the query terms that comprise the collocation are used without meeting the pre-selected threshold.

Returning to further steps depicted in FIG. 2, after the indications of whether certain collocations are disfavored are provided, a collocation error proofing application may go further to search for and provide candidate replacement words to correct the erroneous collocations, as depicted in steps 71, 73, 75, and 77, according to one illustrative embodiment. This may include composing query terms with a wild card replacing one or more of the words in one or more of the disfavored collocations, as in step 71. A wild card may serve as an open placeholder that is inserted into a query term in the place of a suspect word indicated to be potentially erroneous, where the placeholder may correspond to any word inserted in the position of the suspect word within the remainder of the query term in the corpus being searched. A wild card may be used in a search by replacing one of the words with a symbol, such as an asterisk sign, that stands in for the suspected erroneous word.

A word collocation reference may be searched for query terms providing potential collocation candidates, as in step 73, such as those with wild card elements. The word collocation reference may again be the Web or another network-based or local corpus, and may also include a specialized word collocation dictionary reference, such as by screening Web search results to remove collocations not included in the word collocation dictionary, for example.

A search of the collocation reference may then return results with segments of text using any word or phrase in place of the symbol representing the wild card placeholder. For example, referring again to text box 29 for collocation candidates in FIG. 1, the several collocation candidates listed there might all have been returned from a wild card search with a wild card symbol preceding the phrase "this person". The search term may then be, for example "* this person", where the asterisk "*" forms the wild card, and the search results include "known this person", "admitted this person", "thought this person", and so forth. The choice of symbol used to indicate a wild card word by the search tool is arbitrary, and might just as well be an ampersand, a question mark, or anything else.

A wild card may be used in each of a series of query terms based on the same collocation, going sequentially through a series from more to less constrained query templates based on the collocation, analogously to what was done originally to evaluate the propriety or disfavoredness of a subject collocation. For example, for the erroneous collocation sentence "I have recognized this person for years", a series of wild card query terms could include one for the complete sentence, but with a wild card replacing the verb in the collocation, i.e. "I have * this person for years"; one or more query terms based on a reduced sentence format, i.e. "I have * this person", "have * this person for years", "I have * this person"; one or more query terms based on a chunk pair containing the collocation, i.e. "* this person for years", "* this person"; and one or more for the collocation as a word pair, either searched for as immediately adjacent to each other, or within a close proximity, such as separated by no more than one intermediate word, e.g. "* ~person", where the tilde "~" is arbitrarily selected in one illustrative embodiment to be interpreted by the search tool as a proximity placeholder, which can stand for either zero or one words, or possibly more, in its place, separating the wild card and the specified word. Using a wild card in the query term therefore provides one illustrative example of an effective way to compare collocations from the text sample with potentially analogous collocations, at a variety of levels, in content available on the Web or other network-based or local corpus.

A specialized wild card may also be used that is restricted to a finite set of preferential candidates; or a collocation reference against which the results are screened may include an indication of preferred collocation candidates. For example, certain collocation candidates may be preferred based on a process of back-translating from the native language of the writer of the text sample. The user may have an option of entering her native language, or the collocation proofing software may use a tool for evaluating clues in the writing sample that may indicate a likely native language of the writer, for example, which the software may prompt the user to confirm. Other clues may be considered, such as language options that are being used in other software installed on the computer, or indications of the computer's physical location, for example. For instance, if the software detects that it is being run on a computer that is also running its operating system in a Chinese-language version, or the software detects that the computer is connected to the Internet through a server that a reference indicates is physically located in Beijing, while the text sample is in English, it may assign preferential or priority treatment to collocation candidates that are typical of a native Chinese speaker.

If the writer's native language is known, the collocation proofing software may consider whether erroneous collocations are based on improper mapping of the native language of the writer into the non-native language of the writing sample. This may include, for example, mapping errors as applying a native-language grammar rule in the non-native language, misusing a false cognate or a false friend, omitting a plural form when the native language does not distinguish plural forms, etc.

For example, the writer of the text sample that includes "I have recognized this person for years" may be indicated to be a native Chinese speaker. The collocation proofing software may respond to this indication by translating this input into Chinese and checking on candidate translations back into English. "To recognize" may be translated into the Mandarin Chinese word, "rènshi" (as rendered in Hanyu Pinyin), a word that may be translated into English as either "to recognize" or "to know". A back translation may therefore indicate that "know" is a likely replacement candidate for "recognize", to render, "I have known this person for years". As another example, an English text sample by a writer indicated to be a native French speaker may include the sentence, "I commanded the faith and onions", with both "commanded" and "faith" tagged for disfavored word collocations. This might be translated into French as "J'ai commande le foi et des oignons", with "commandé" properly back-translated as "ordered" and "le foi" respelled as "le foie" to back-translate as "the liver", so that the software prioritizes or adds weight to these collocation candidates among any others generated by the search results, and may suggest replacement collocation candidates to render the sentence as "I ordered the liver and onions".

In either case, the back translation from the native language may have been used to restrict the candidate replacement search in the first place, or it may have been used as a collocation reference to evaluate or prioritize among potential replacement candidates generated by the search.

After searching a word collocation reference for query terms, as in step 73, step 75 may be performed, for identifying results of the search having a relatively high proportion of a candidate word replacing the wild card, in this illustrative embodiment. This may again use different weighting for different match types, between search results that provide a match to the full sentence, the reduced sentence, the chunk pair, or the word pair that contain the collocation, in one illustrative embodiment. A total score may be a weighted sum of scoring components from each type of query term, where each scoring component is a product of the number of search results found for that query term times the weight assigned to that query term, for example. A relatively high total score using a method such as this may be interpreted as an effective measure of a relatively high proportion of a candidate word replacing the wild card, and serving as a likely potential for correcting the erroneous collocation, in this illustrative embodiment.

A wild card may be particularly directed to certain parts of speech or chunk types in a query term. For example, in a set of query terms based on verb-noun collocations, the verbs in each of the collocations may be replaced by a wild card in one set of query terms, and the nouns in each of the collocations may be replaced by a wild card in another set of query terms. For a preposition-noun collocation, the prepositions in particular may be the part of the collocation selected for replacement by a wild card, since the noun may be more likely to be associated with the intended meaning of the sentence, and because the particular preposition to be selected may be more commonly subject to erroneous collocation usage by intermediate learners of the language. Targeting the preposition for replacement by a wild card in query terms based on preposition-noun collocations may therefore support a strategy for lowering the time required to produce the desired replacement collocation. Similarly, the wild card may be preferentially selected as the adjective in an adjective-noun collocation and the adverb in a verb-adverb collocation, again because the noun and the verb may be more likely to be anchored to the intended meaning, while adjectives and adverbs may be more prone to erroneous collocation than the nouns and verbs they modify. Other particular parts of speech or chunk types may be selected for preferential or exclusive replacement by wild cards in query terms in other embodiments.

A potential replacement word found to have a significantly greater proportion than the suspect word among the search results may then be indicated as a suggested replacement for the apparently disfavored part of the collocation. This may be done after also cross-referencing a collocation with the potential replacement word for inclusion in a collocation reference, such as a dictionary of proper word collocations or a cross-reference with suggested back-translations based on the writer's native language, as discussed above.

The results of the search, having one or several potential collocation candidate words, such as those found to have the highest matching scores, may be provided via a user output as the potentially proper word collocations, as in step 77 of FIG. 2. This may be analogous to the collocation candidates displayed in text box 29 of FIG. 1, for example, such that a user is enabled to select one of the collocation candidates to replace the collocation indicated to be erroneous. Sometimes, a single collocation will have a substantially better indication of likelihood as the proper replacement for the erroneous collocation. This is the case in the depiction of FIG. 4.

FIG. 4 depicts a user interface 410 for a computing system enabling a collocation proofing method, according to an illustrative embodiment. User interface 410 includes the same tabs at the top thereof as collocation error proofing interface 10 of FIG. 1; specifically, tab 11, labeled "Load ESL Sentences" (again, illustratively directed to a particular ESL embodiment), and tab 13, labeled "Run Queries". While FIG. 1 depicts user interface 10 with the "Load ESL Sentences" tab 11 selected, FIG. 4 depicts user interface 410 with tab 13 selected, with its associated buttons, captions, text boxes, and other user interface elements on display. These are divided into an upper section, labeled "ESL Parsed Sentences", and a lower section, labeled "Levels of Queries". User interface 410 is directed to engaging in particular types of queries, and providing results via the user interface of searches performed on those queries, in support of an illustrative embodiment of collocation error proofing.

The upper "ESL Parsed Sentences" section includes a text box, 25, analogous to text box 25 of FIG. 1, and which here includes the same parsed sentence. This section also includes a row 41 of buttons below the parsed sentence text box 25. These include buttons for a variety of different illustrative query templates to perform searches based on the parsed sentence. In particular, in this illustrative embodiment, are buttons labeled "Create Queries"; "Submit S-Queries I" and", "Submit S-Queries II", referring to different sentence-based queries, such as for complete or reduced sentences; "Submit C-Queries I" and "Submit C-Queries II", for different types of chunk pair queries; and "Submit W-Queries", for queries based on the pair of individual words of the collocation, in accordance with the discussion above.

The lower section of user interface 410 includes a text box 43 for sentence level queries, a text box 45 for chunk first level queries, and a text box 47 for chunk second level queries, as illustrative examples of some of the query result text boxes that may be called up to present replacement collocation candidate words. Each of the text boxes 43, 45, and 47 is also depicted with a hit count for the query search results for that collocation candidate, and a separate text box to its right that may display some of the query search results from the corpus corresponding to each query type. As suggested by the figure, "known" is strongly indicated as the proper replacement word for "recognized" at each of the query template levels, in the collocation being proofed, in this illustrative example. This illustrates that the tiered scheme of query templates provided a redundancy that was more than sufficient in this case to present a convincing case for one particular replacement candidate. A user may then consider the hit count for each of the query templates as she desires, and select one of the replacement collocation candidates to replace the disfavored word collocation to which it corresponds.

While FIGS. 1 and 4 depict graphic display panels associated with a dedicated application embodiment, another illustrative embodiment may function in a less obvious way in connection with another application, such as a word processing program, a web browser, an email application, a presentation program, or other application that involves user input of text or another form of natural language. Such other program or application may cooperate with a separate error collocation proofing program embodiment, or may include a module of its own comprising an error collocation proofing embodiment, for example. A collocation error proofing tool may be accessible under a tools menu in the other application, for example, or may be accessible as an option in a pop-up menu when a user right-clicks on a word, as another example, in different embodiments.

In yet another mode of operation, the other program may run an error collocation proofing module or program automatically in a default setting, and may automatically provide indications of erroneous or disfavored collocations by means of a marking applied to the words on the monitor. The marking may take the form of a blue jagged line under a collocation, for example, to indicate it as erroneous or disfavored. In yet another mode of operation, a separate module or program may run to detect whether a user input includes indications that the user is not a native user of the language of the input, and the indication of non-native usage may trigger the activation of an error collocation module or program, for example.

Figure 5:
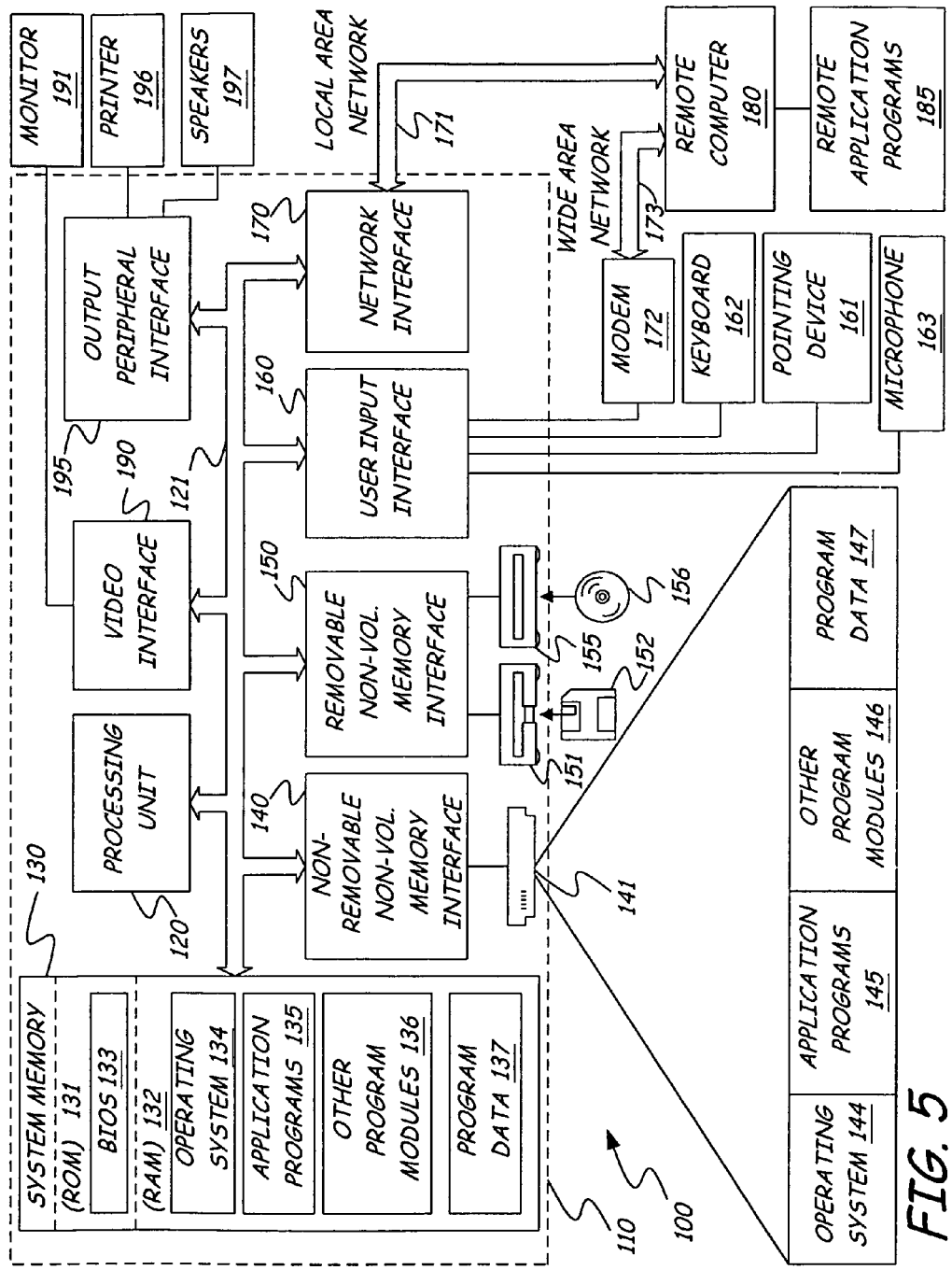
FIG. 5 depicts a block diagram of a computing environment in which some embodiments may be practiced.

FIG. 5 illustrates an example of a suitable computing system environment 100 on which various embodiments may be implemented. For example, various embodiments may be implemented as software applications, modules, or other forms of instructions that are executable by computing system environment 100 and that configure computing system environment 100 to perform various tasks or methods involved in different embodiments. A software application or module embodying a collocation error proofing embodiment may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

According to one illustrative embodiment, computing system environment 100 may be configured to perform collocation error proofing tasks in response to receiving an indication of a word collocation in a text. Computing system environment 100 may then perform a Web search for each of one or more query templates associated with the indicated word collocation. Various query templates used may include a sentence, a reduced sentence, a chunk pair, and/or an individual word pair, any of which may include the word collocation. Computing system environment 100 may then evaluate whether results of the Web search for each of the query templates indicates that the word collocation corresponds to normal usage, or whether it is disfavored or indicative of likely error. Normal usage may be indicated by either an exact match of the query template comprising the sentence, or a matching score that is larger than a preselected threshold. The system may then indicate, as part of the output of computing system environment 100 via a user-perceptible output device as a result of an embodiment of a collocation error proofing method, whether the word collocation corresponds to normal usage, or is disfavored and is indicated to be erroneous usage.

Computing system environment 100 as depicted in FIG. 5 is only one example of a suitable computing environment for executing and providing output from various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 5, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on remote computer 180. It will be appreciated that the network connections shown are exemplary and other means of establishing a communications link between the computers may be used.

Figure 6:
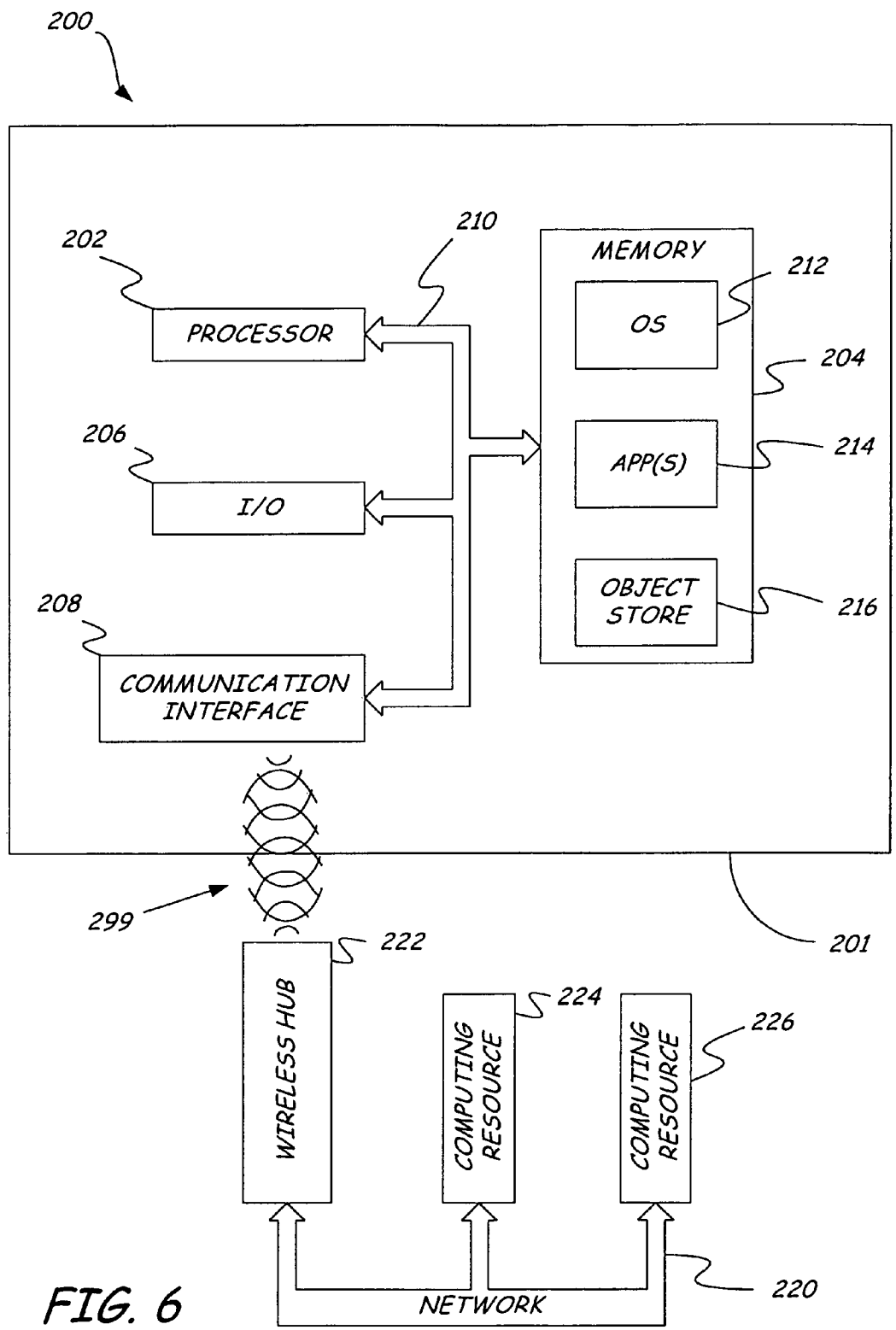
FIG. 6 depicts a block diagram of another computing environment in which some embodiments may be practiced.

FIG. 6 depicts a block diagram of a general mobile computing environment, comprising a mobile computing device and a medium, readable by the mobile computing device and comprising executable instructions that are executable by the mobile computing device, according to another illustrative embodiment. FIG. 6 depicts a block diagram of a mobile computing system 200 including mobile device 201, according to an illustrative embodiment. Mobile device 201 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device 201 to perform non-native language proofing queries and other tasks, in a few illustrative embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method, implemented by a computing system comprising one or more processors, the method comprising:

comparing, using one or more of the processors, one or more collocations from a text sample with a corpus;

identifying, using one or more of the processors, whether the collocations are disfavored in the corpus; and providing indications of whether the collocations are disfavored via an output device;

in which comparing the collocations with the corpus comprises performing one or more searches of the World Wide Web using one or more query terms that comprise each of one or more of the collocations; and in which for each of one or more of the collocations for which searches are performed, a search is performed for each of the one or more query terms that comprise the collocation until either one of the query terms provides search results that meet a preselected threshold for matching the collocation, or all the query terms that comprise the collocation are used without meeting the preselected threshold, and further comprising:

composing one or more query terms with a wild card replacing a word in one of the disfavored collocations;

searching a word collocation reference for the query terms;

identifying results of the search having a relatively high proportion of a candidate word replacing the wild card; and providing the results of the search having the candidate word via the output device as potentially proper word collocations.

2. The method of claim 1, wherein the corpus comprises content on the World Wide Web.

3. The method of claim 1, wherein a collocation is disfavored if either it is not found in the corpus, or it does not score above a preselected threshold matching score indicating a significant presence of fuzzy matches of the collocation in the corpus.

4. The method of claim 1, wherein the corpus comprises content accessible on a network.

5. The method of claim 1, wherein for each of the collocations for which searches are performed, the collocation is disfavored if query terms that comprise the collocation do not score above a preselected threshold matching score indicating a significant presence of fuzzy matches of the query terms in the corpus.

6. The method of claim 1, wherein at least one of the query terms comprises a sentence that comprises the collocation.

7. The method of claim 1, wherein at least one of the query terms comprises a reduced sentence that comprises the collocation, wherein the reduced sentence is formed by removing auxiliaries from a sentence that comprises the collocation.

8. The method of claim 1, wherein at least one of the query terms comprises a pair of chunks comprising the collocation.

9. The method of claim 1, wherein at least one of the query terms comprises a pair of words comprising the collocation.

10. The method of claim 1, further comprising part-of-speech tagging the text sample, and further wherein the collocations that are compared with the corpus are selected from the text sample for comprising at least one of a verb-noun collocation, a preposition-noun collocation, an adjective-noun collocation, and a verb-adverb collocation.

11. The method of claim 1, wherein the text sample is in a target language, and the method further comprises screening the corpus to compare the collocations only with content indicated to be in the target language.

12. The method of claim 1, further comprising screening the text sample to determine whether it is indicated to show non-native usage, and if the text sample is indicated to show non-native usage, then automatically initiating the step of comparing the collocations from the text sample with the corpus.

13. The method of claim 1, wherein the query terms comprise one or more of a sentence template, a chunk template, and a word template, and wherein the results of the search having a relatively high proportion of the candidate word replacing the wild card are evaluated by multiplying a proportion of the search results that comprise the candidate word by a query template weight that is highest for the sentence template, lower for the chunk template, and lowest for the word template.

14. The method of claim 1, wherein the query terms comprise one or more of a verb-noun collocation, a preposition-noun collocation, an adjective-noun collocation, and a verb-adverb collocation, and the wild card is selected as the verb in a verb-noun collocation, the noun in a verb-noun collocation, the preposition in a preposition-noun collocation, the adjective in an adjective-noun collocation, or the adverb in a verb-adverb collocation.

15. The method of claim 1, further comprising enabling a user to select one of the potentially proper word collocations to replace the disfavored word collocation to which it corresponds.

16. A non-transitory computer readable storage medium comprising instructions executable by a computing system comprising one or more processors, wherein the instructions configure the computing system to:

receive an indication of a word collocation in a text;

using one or more of the processors, perform a Web search for each of one or more query templates associated with the indicated word collocation, wherein one of the query templates comprises a sentence in which the word collocation was found, one of the query templates comprises a reduced sentence based on the sentence in which the word collocation was found, one of the query templates comprises a chunk pair comprising the word collocation, and one of the query templates comprises an individual word pair comprising the word collocation;

using one or more of the processors, evaluate whether results of the Web search for each of the one or more query templates indicates that the word collocation corresponds to normal usage or is a disfavored collocation, as indicated by either an exact match of the query template comprising the sentence, or an exact match of the query template comprising the reduced sentence, or a matching score for the query template comprising the chunk pair that is larger than a preselected threshold for a chunk pair, or a matching score for the query template comprising the individual word pair that is larger than a preselected threshold for an individual word pair;

indicate via a user-perceptible output device whether the word collocation corresponds to normal usage or whether the word collocation is disfavored;

and further comprising:

composing one or more query terms with a wild card replacing a word in one of the disfavored collocations;

searching a word collocation reference for the query terms;

identifying results of the search having a relatively high proportion of a candidate word replacing the wild card; and providing the results of the search having the candidate word via the output device as potentially proper word collocations.

17. A computing system comprising:

a computer processor and a data store accessed by the computer processor, the data store storing computer readable instructions and the computer processor accessing the computer readable instructions to:

identify word collocations in a text;

search the World Wide Web for a set of query templates based on each of one or more of the word collocations; and indicate via a user output device whether results of the search indicate that the word collocations are relatively scarce on the World Wide Web;

compose one or more query terms with a wild card replacing a word in one of the relatively scarce word collocations;

search the World Wide Web for the query terms;

identify results of the search having a relatively high proportion of a candidate word replacing the wild card; and provide the results of the search having the candidate word via the output device as possible replacements for the relatively scarce word collocations.

\* \* \* \* \*